(12) United States Patent
Nobis et al.

(10) Patent No.: US 10,760,898 B2
(45) Date of Patent: Sep. 1, 2020

(54) OPTICAL DEVICE AND METHOD FOR INSPECTING TIRES

(75) Inventors: Guenter Nobis, Nuertingen (DE);
Steffen Abraham, Hildesheim (DE);
Axel Wendt, Stuttgart (DE); Michael Klar, Bad Friedrichshall (DE)

(73) Assignee: BEISSBARTH GMBH, Munich (DE)

( * ) Notice: Subject to any disclaimer, the term of this patent is extended or adjusted under 35 U.S.C. 154(b) by 682 days.

(21) Appl. No.: 14/131,989

(22) PCT Filed: Jun. 18, 2012

(86) PCT No.: PCT/EP2012/061596
§ 371 (c)(1),
(2), (4) Date: Apr. 21, 2014

(87) PCT Pub. No.: WO2013/007479
PCT Pub. Date: Jan. 17, 2013

(65) Prior Publication Data
US 2014/0232852 A1 Aug. 21, 2014

(30) Foreign Application Priority Data

Jul. 11, 2011 (DE) .......... 10 2011 078 959
Feb. 15, 2012 (DE) .......... 10 2012 202 271

(51) Int. Cl.
*G01B 11/22* (2006.01)
*G01N 21/95* (2006.01)
(Continued)

(52) U.S. Cl.
CPC .......... *G01B 11/22* (2013.01); *G01B 11/2522* (2013.01); *G01N 21/95* (2013.01); *G06T 7/0008* (2013.01); *G06T 7/40* (2013.01)

(58) Field of Classification Search
CPC .. G01M 17/027; G01M 17/013; G01M 17/02; G01M 17/025; G01M 17/0074;
(Continued)

(56) References Cited

U.S. PATENT DOCUMENTS 3,918,816 A * 11/1975 Foster .................... G01B 11/24
356/602
4,918,976 A * 4/1990 Fogal, Sr. ........... G01M 17/027
73/146
(Continued)

FOREIGN PATENT DOCUMENTS

DE  1 809 459    6/1970
DE  41 01 921    8/1991
(Continued)

OTHER PUBLICATIONS

European Office Action dated Jan. 3, 2019, issued in European Application No. 12730446.7, filing date Jun. 18, 2012.

*Primary Examiner* — Chikaodili E Anyikire
*Assistant Examiner* — Kehinde Abimbola
(74) *Attorney, Agent, or Firm* — Norton Rose Fulbright US LLP (57) ABSTRACT

A method for tire inspection which includes taking at least one image of at least one first area of a tread of a tire that is to be inspected; determining the profile depth of a second area of the tread of the tire, the second area being included in the first area; and displaying the profile depth of the at least one image of the at least one first area and the position of the second area in the first area. The method may additionally include automatically analyzing the images taken of the tread, so as to arrive at statements on the condition of the tread.

23 Claims, 6 Drawing Sheets (51) Int. Cl.
*G06T 7/00* (2017.01)
*G06T 7/40* (2017.01)
*G01B 11/25* (2006.01)

(58) Field of Classification Search
CPC . G01M 17/021; G01M 17/028; A61B 5/0059;
A61B 6/4021; A61B 6/4405; A61B
6/4417; A61B 6/4423; A61B 6/5247;
A61B 8/4472; G01N 2223/627; G01N
23/185; G01N 23/043; B60C 23/0401;
B60C 23/0416; B60C 23/0472; B60C
23/0479; B60C 23/008; B60C 23/009;
B60C 23/0408; B60C 23/0415; H01L
29/7395; H01L 29/36; H01L 29/1095;
H01L 21/26513; H01L 29/0847; H01L
29/1608; H01L 29/0619; H01L 29/66068;
H01L 21/26506; H01L 29/66333; H01L
29/7833
See application file for complete search history.

(56) References Cited

U.S. PATENT DOCUMENTS

| | | | | |
|---|---|---|---|---|
| 5,103,595 | A * | 4/1992 | Dale | G01M 1/30 451/11 |
| 5,174,151 | A * | 12/1992 | Adachi | G01M 17/027 356/71 |
| 5,245,867 | A | 9/1993 | Sube et al. | |
| 5,249,460 | A | 10/1993 | Dory et al. | |
| 5,895,845 | A * | 4/1999 | Burger | G01B 11/22 73/146 |
| 5,987,978 | A * | 11/1999 | Whitehead | G01B 11/22 73/146 |
| 7,079,018 | B2 * | 7/2006 | Hottebart | G01D 7/002 116/34 B |
| 7,269,997 | B2 * | 9/2007 | Dale, Jr. | G01B 11/22 73/146 |
| 7,343,789 | B2 * | 3/2008 | Fujisawa | G01B 11/25 73/146 |
| 7,421,108 | B2 * | 9/2008 | Kaneko | G01B 11/24 382/141 |
| 7,466,430 | B2 * | 12/2008 | Braghiroli | G01M 1/02 356/601 |
| 7,523,655 | B2 * | 4/2009 | Braghiroli | G01B 11/2755 73/146 |
| 7,578,180 | B2 | 8/2009 | Lionetti et al. | |
| 7,604,029 | B2 * | 10/2009 | Myatt | B60C 11/24 152/152.1 |
| 7,797,995 | B2 * | 9/2010 | Schafer | B60C 11/24 73/146 |
| 8,125,323 | B2 * | 2/2012 | Stephan | B60C 23/0498 340/447 |
| 8,284,393 | B2 * | 10/2012 | Takahashi | G01B 11/25 356/237.1 |
| 8,305,436 | B2 * | 11/2012 | Fujisawa | G01M 17/027 348/92 |
| 8,542,881 | B2 * | 9/2013 | Teti | G06T 7/0004 382/104 |
| 8,584,721 | B2 * | 11/2013 | Fujii | B60C 11/24 152/154.2 |
| 8,618,924 | B2 * | 12/2013 | Fujisawa | G01B 11/245 340/442 |
| 8,621,919 | B2 * | 1/2014 | Pingel | B60C 11/246 73/146 |
| 8,736,435 | B2 * | 5/2014 | Kanenari | B60C 23/0471 340/425.5 |
| 9,113,046 | B2 * | 8/2015 | Fujii | G01B 11/25 |
| 10,295,333 | B2 * | 5/2019 | Fish | H04N 7/18 |
| 2005/0058333 | A1 * | 3/2005 | Kaneko | G01B 11/24 382/141 |
| 2005/0134443 | A1 * | 6/2005 | Hottebart | G01D 7/002 340/442 |
| 2005/0268707 | A1 * | 12/2005 | Dale, Jr. | G01B 11/22 73/146 |
| 2006/0220814 | A1 * | 10/2006 | Kawashima | B29C 73/22 340/442 |
| 2007/0175555 | A1 * | 8/2007 | Myatt | B60C 11/24 152/152.1 |
| 2007/0209431 | A1 * | 9/2007 | Fujisawa | G01B 11/25 73/146 |
| 2007/0280529 | A1 * | 12/2007 | Kaneko | G01B 11/24 382/154 |
| 2008/0027658 | A1 * | 1/2008 | Ichikawa | G01N 3/56 702/34 |
| 2008/0168833 | A1 * | 7/2008 | Awad | B60C 11/243 73/146 |
| 2008/0256815 | A1 * | 10/2008 | Schafer | B60C 11/24 33/739 |
| 2009/0040533 | A1 * | 2/2009 | Takahashi | G01B 11/2522 356/612 |
| 2009/0179748 | A1 * | 7/2009 | Stephen | B60C 23/0498 340/447 |
| 2009/0281738 | A1 * | 11/2009 | Fujisawa | G01B 11/306 702/35 |
| 2010/0026799 | A1 * | 2/2010 | Fujisawa | G01M 17/027 348/92 |
| 2010/0180676 | A1 * | 7/2010 | Braghiroli | G01M 17/027 73/146 |
| 2011/0069323 | A1 * | 3/2011 | Takahashi | G01B 11/25 356/625 |
| 2011/0102811 | A1 * | 5/2011 | Kaneko | G01B 11/0608 356/625 |
| 2011/0192548 | A1 * | 8/2011 | Dupray | B60C 25/147 157/14 |
| 2012/0013458 | A1 * | 1/2012 | Kanenari | B60C 23/0471 340/447 |
| 2012/0020526 | A1 * | 1/2012 | Teti | G06T 7/0004 382/104 |
| 2012/0092149 | A1 * | 4/2012 | Fujisawa | G01B 11/245 340/442 |
| 2012/0242824 | A1 * | 9/2012 | Takahashi | G01B 11/0608 348/86 |
| 2013/0120566 | A1 * | 5/2013 | Fujii | H04N 7/18 348/135 |

FOREIGN PATENT DOCUMENTS

| | | |
|---|---|---|
| DE | 43 16 984 | 8/1994 |
| DE | 295 08 978 | 8/1995 |
| DE | 195 15 949 | 11/1996 |
| DE | 197 05 047 | 8/1998 |
| DE | 10 2009 016498 | 10/2010 |
| EP | 0 469 948 | 2/1992 |
| EP | 0 816 799 | 1/1998 |
| EP | 1 394 503 | 3/2004 |
| EP | 1 515 129 | 3/2005 |
| EP | 1 952 092 | 6/2008 |
| WO | 96/10727 | 4/1996 |
| WO | 97/07380 | 2/1997 |

* cited by examiner

Fig. 3

OPTICAL DEVICE AND METHOD FOR INSPECTING TIRES

FIELD OF THE INVENTION

The present invention relates to a device and a method for the contactless inspection and profile depth determination of tires of a vehicle, especially a motor vehicle.

BACKGROUND INFORMATION

A number of methods and devices are believed to be understood for the contactless measurement of the profile depth of vehicle tires. In some of these methods, the measurement takes place on the dismounted tire, which is fastened rotatably in a special test stand. Other methods measure the profile depth of tires mounted on the vehicle. This may take place, on the one hand, by driving over a sensor installed in the floor or in a ramp. On the other hand, there are methods for measuring the profile depth on a roller type test stand. Finally, mobile handheld units are known for the profile measurement.

The documents U.S. Pat. Nos. 3,918,816, 5,245,867, 5,249,460 and EP 1 515 129 B1 discuss test stands for measuring the profile depth over the entire tread of a dismounted tire by sequential scanning of the tire tread, using a laser beam. For this, the tire has to be rotated in a controlled manner and the laser beam has to be shifted laterally mechanically.

Patent document DE 41 01 921 discusses a wheel balancing machine, with which the tread of a tire may be measured by a light section method. In this case, the dismounted tire has to be rotated as well.

Patent document DE 195 15 949 discusses the profile measurement over the complete tread of a dismounted tire by a stripe projection method. In this case, the tire is mounted on a rotational axis of a test stand, and rotated step-wise to a series of angular positions. A planar section of the tread is measured for each angular position. The tire has to be in an at-rest position for the taking of the image of each section, since a plurality of successive takes are required having different stripe illumination.

Patent document DE 1 809 459 discusses a light section method for measuring the profile depth during crossover. In this case, the profile depth is measured along a single line parallel to the rotational axis of the tire.

Patent document DE 43 16 984 discusses a method for measuring the profile depth during crossover. In this case, a triangulation sensor is shifted along a line transverse to the rolling direction of the tire.

Documents EP 0 469 948 B1, EP 1 952 092 B1 and U.S. Pat. No. 7,578,180 B2 discuss additional variants of triangulation methods for profile measurement during crossover.

Patent document WO 97/07380 A2 discusses the use of a light section method having one or more light sections for the measurement during crossover or in a roller set.

Patent document WO 96/10727 also discusses a triangulation method for measuring the profile depth on the vehicle. In addition to the profile measurement, an image-based visualization of the tire is suggested. For the illustration of a greater section of the tread, however, the tire has to be rotated in a roller set.

Patent document EP 0816799 A2 discusses, among other things, a variant in which the sensor is fastened to the vehicle and scans the tire during the movement of the vehicle.

Triangulation methods, using laser scanners for profile measurement in a roller type test stand, are in DE 197 05 047 A1 and EP 1 394 503 B1.

Patent document DE 295 08 978 discusses a handheld laser measuring head for measuring the profile depth.

Patent document DE 10 2009 016 498 A1 discusses a method for ascertaining the profile depth of a vehicle tire, the tire being mounted on a vehicle on which the tire is rolled over the measuring station or stopped on it. The profile of the tire is optically scanned on at least one measuring line that is transverse to the rolling direction of the tire, a ray fan starting from a light source being reflected at the tire surface, and a signal of the reflected ray fan being picked up by a sensor and the signal of the reflected ray fan being evaluated using a triangulation method. In this context, the signal is picked up non-orthogonally to the tire surface.

What is common to all the methods named is that the profile depth is measured in each case along a single line or only on a small area of the tire tread, or that, for the measurement of a larger area of the tire tread, the wheel has to be dismounted, the vehicle has to be driven into a roller type test stand or the sensor has to be moved. Inspecting a greater area of the tread of the tire is therefore associated with increased effort.

SUMMARY OF THE INVENTION

It is an object of the present invention to provide a device and a method which enable, using the least possible effort, inspecting the condition of a larger area of the tread of the tire.

A method according to the present invention for tire inspection includes the steps: taking at least one image of at least one first area of a tread of a tire that is to be inspected; determining in a planar manner the profile depth of a second area of the tread of the tire; the second area being included in the first area; displaying the determined profile depth of the second area of the at least one image of the at least one first area and of the position of the second area within the first area.

A device according to the present invention for inspecting tires has a camera, which is developed to take an image of at least one area of the tread of a tire that is to be inspected; an optical projection device, which is developed for the illumination of at least one second area of the tread of the tire that is to be inspected, the second area being a part of the first area; an evaluation device which is developed to determine the profile depth in the second area of the tread of the tire from the image taken by the camera; and a display device that is developed to display the profile depth determined by the evaluation device, the image of the at least one first area of the tread and the position of the second area within the first area of the tire.

By the combination of the representation of an image of the first area with the result of the profile depth measurement that is limited to the second area, one is able to value the entire first area of the tread, according to the present invention. The optical illustration of the first area of the tread permits the detecting of large-area wear patterns; this is not possible by recording small sections, as is usual in the related art. A large-area and visually processed two-dimensional image representation of the tire tread in addition to the profile depth measurement, permits the user to recognize a non-uniform wear, for instance, because of wrong wheel alignment, defective shock absorbers or the like. The planar representation of the wear image simplifies the conversation with the customer, for explaining to the customer shortcomings present in the tire.

In one specific embodiment, the prepared 2D image is a 2D gray-scale value image or a 2D colored image. A gray-scale value image and particularly a colored image each enable an exact representation of the tread, which makes it possible for the service technician to detect shortcomings of the tread accurately.

In one specific embodiment, the measurement of the profile depth takes place by triangulation, which may be with the aid of a textured illumination. Triangulation is a tried and true method for determining the profile depth. With the aid of a textured illumination, the measurement is able to be carried out particularly simply and accurately.

In one specific embodiment, the method includes determining the minimum profile depth of the tread. The minimum profile depth is a value that is particularly relevant to safety. If the minimum profile depth falls below a specified (such as a legal) minimum value, a warning message may be output automatically to prevent the falling below the minimum value from being overlooked.

In one specific embodiment, the method includes taking an image sequence having a plurality of 2D images of the tire's tread, and from the images of the image sequence, putting together one image of a larger area of the tire's tread. In such a specific embodiment, a particularly large area of the tread is able to be monitored; in particular, an area may be monitored which is larger than the exposure range of the camera.

In one specific embodiment, the method includes identifying characteristic features of the tread and putting together the images of the image sequence with the aid of the characteristic features. The utilization of characteristic features permits an effective and reliable combination of the images of an image sequence to form a larger overall picture.

In one specific embodiment, the method includes analyzing the images of the image sequence automatically, in order to arrive at statements on the condition of the tread. The tire inspection is able to be simplified, sped up and made more objective by an automated analysis of the tread. In particular, subjective influences and faulty estimations in tire inspection may be avoided by this examination.

In one specific embodiment, the method includes taking into account in the analysis the previously determined profile depth. By taking into account the previously determined profile depth, the results of the automatic analysis may be improved even more.

In one specific embodiment, the method includes identifying texture features of the tread and comparing them to previously stored texture features. The comparison of the currently measured texture features to the texture features from the data bank makes possible the automated valuing of the tire. In this instance, methods from machine learning may be used. A classifier may be trained which will assign the currently measured texture features of an existing class from the data bank. By comparison of the texture features with the classes of the data bank, a classification of the tire type is made possible. Furthermore, certain images of damage and degrees of abrasion may be classified and detected.

Alternatively, it is also possible to compare to one another the texture features among the 4 tires of a vehicle. With that, it may be detected whether, for example, different tires were mounted on the vehicle, or whether there exist different states of wear.

For the texture projection, both a planar and a linear texture projection may be used. The method may contain an automated evaluation of the tread image, which includes the analysis of the abrasion image and of a possibly present abrasion pattern, the detection of damaged places and/or foreign elements.

In the following text, the present invention will be explained in greater detail with reference to the appended figures.

DETAILED DESCRIPTION

Figure 1:
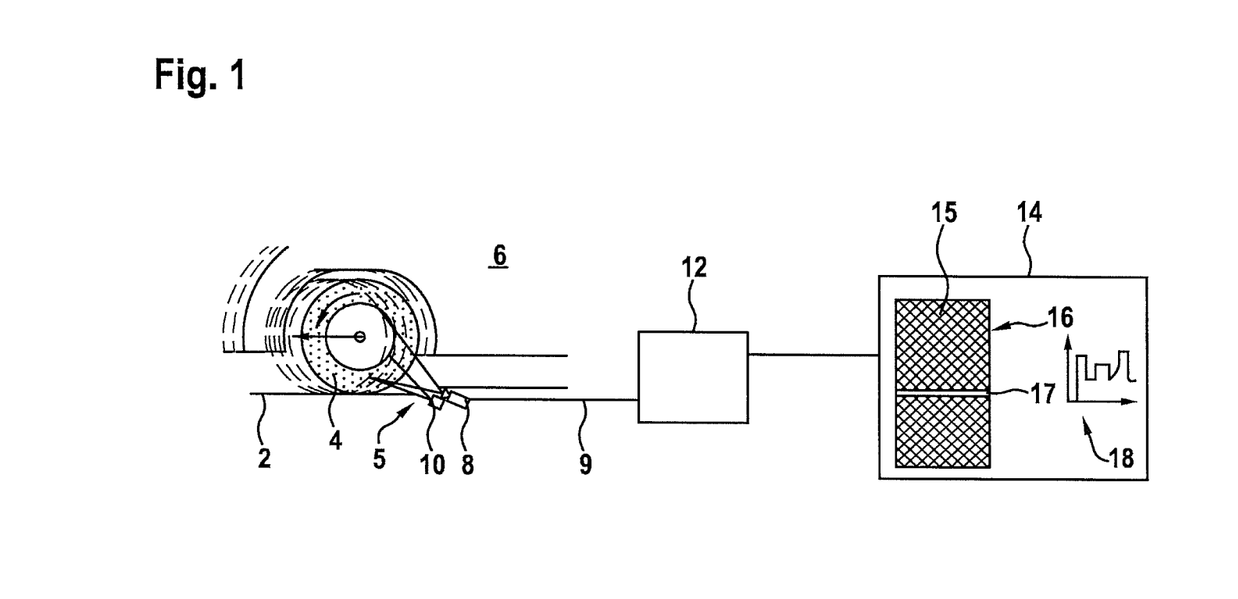
FIG. 1 shows a schematic construction of the measuring device according to the present invention.

FIG. 1 shows schematically the construction of a measuring device having a plane 2, on which a tire 4, that is to be inspected, of a vehicle 6 is rolling.

Below plane 2, a camera 8 and a texture projection device 10 are situated so that they are optically able to record tire 4 rolling on plane 2, or irradiate it with light. For this, an opening 5 is provided in plane 2, or a transparent area. Camera 8 and texture projection device 10 may be located, for example, in a pit inset in the floor below plane 2, or even within a construction that vehicle 6 will travel over. Alternatively, camera 8 and texture projection device 10 may also be situated above plane 2 in such a way that they optically record tread 16 of tire 4, without colliding with it during the movement of vehicle 6 over plane 2. The direction of motion of vehicle 6 is unimportant for the recording.

During the travel of tire 4, camera 8 records tire tread 16 in such a way that, over a plurality of image-taking time periods, on the one hand, the second area illuminated in a textured manner by texture projection device 10 and, on the other hand, a first area illuminated in a non-textured manner of tire tread 16 is recorded. The measurement of the profile depth in the second area, that is illuminated in a textured manner, assumes that the tire tread is located directly in front of camera 8 and texture projection device 10. In addition, at all other times, camera 8 records a first area 15 of tire tread 16, which is not illuminated in a structured manner. Camera 8 is aligned so that, during the travel-over motion of vehicle 6, it is able optically to record, directly or indirectly, tire tread 16 at a plurality of points in time, so that, by and by, a large area, up to the entire tread 16 of tire 4, is able to be recorded.

Camera 8 is connected to an evaluation device 12, via a data cable 9, which evaluates the images taken by camera 8 and displays the processed images and the measuring results, gained from an analysis of the images, on an optical display device 14. Evaluation device 12 is developed in particular to ascertain the profile depth in second area 17, over the entire width of tread 16 of tire 4, from the images of second area 17 taken by camera 8, for example, using a triangulation method.

In FIG. 1, display device 14 shows an image of a first area 15 of tread 16 of tire 4, second area 17, running transversely over tread 16, in which the profile depth has been determined from the data measured by structure projection device 10, being characterized by a marking 17 running horizontally over tread 16. In addition, in a two-dimensional diagram 18, display device 14 shows the curve of the profile depth over the width of tread 16 in second area 17 that is characterized by the marking.

Display device 14 makes it possible for the user not only to determine the profile depth of tread 16 in a narrowly bordered local second area 17, but at the same time to acquire an overall impression on a broadened first area 15 of tread 16 of tire 4 in the surroundings of second area 17, in which the profile depth has been measured. The overall state of tire 4, and particularly its tread 16, is thus able to be determined and assessed better in this manner than using the usual methods and devices.

In one possible extension of the device shown in FIG. 1, all four wheels 4 of a vehicle 6 may be observed simultaneously and compared to one another. For this purpose, four measuring combinations, each including one camera 8 and one structure projection device 10, may be provided, in order to take simultaneously all four wheels 4 of a vehicle 6.

In one cost-effective variant, only two measuring combinations of camera 8 and structure projection device 10 may be provided, which each take images, one after the other, of a front wheel 4 and a rear wheel 4 of vehicle 6, which are being driven over plane 2, so that, one after another, front wheels 4 and rear wheels 4 come into the recording area of camera 8 and structure projection device 10. The images taken of the individual wheels 4 and the structure projection data are then combined by evaluation device 12 to form a simultaneous representation of the images and measured data of all four wheels 4.

Figure 2:
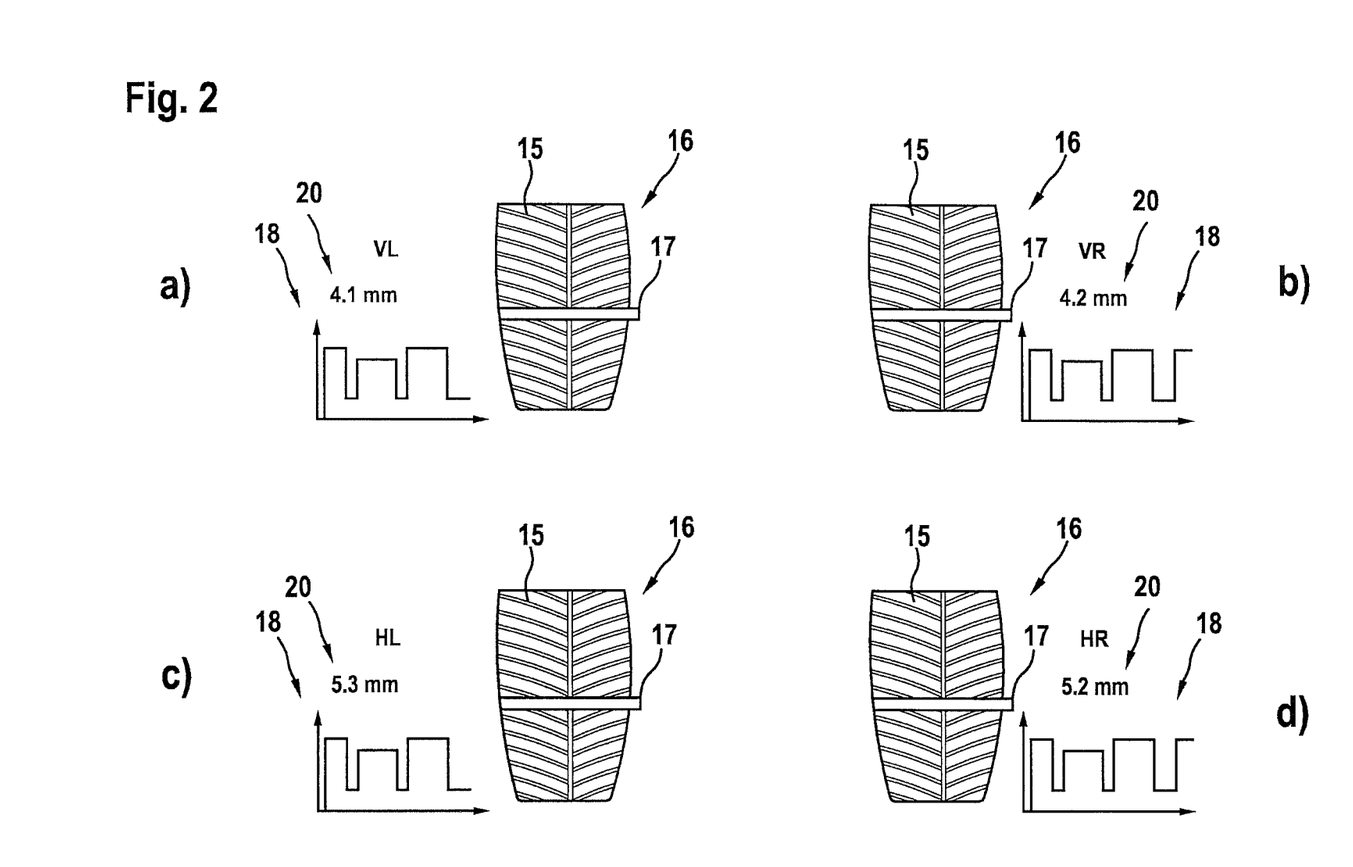
FIG. 2 shows a combined representation of the first areas of the treads of all four wheels of a vehicle, and the profile data gained from the taken images in each case in one two-dimensional diagram.

FIG. 2 shows such a combined representation of first area 15 of treads 16 of all four wheels 4 of a vehicle 6, and the profile data gained from the taken images in each case in one two-dimensional diagram 18.

In this context, FIG. 2a shows the left front wheel, FIG. 2b shows the right front wheel, FIG. 2c the left rear wheel and FIG. 2d the right rear wheel of a vehicle 6. In each of FIGS. 2a to 2d, respectively the image of a first area 15 of tread 16 of the respective wheel 4 is shown, that has been taken by optical camera 8. By a bar that runs transversely over tread 16 of respective wheel 4, there is marked in each case second area 17 of tread 16, for which, with the aid of texture projection device 10, the profile depth of tread 16 of tire 4 has been ascertained. The horizontal pattern of second area 17 is only an example. If required, another orientation, such as a slantwise orientation of an orientation of second area 17 parallel to the running direction of tire 4 is also possible.

In a two-dimensional profile depth diagram 18, which is shown next to the respective image of first area 15 of tread 16, the curve of the profile depth is shown over the width of tread 16 in second area 17 marked by the bar. Because of the combination of profile depth diagram 18 with the optical representation of tread 16 and the marking of second area 17, in which the profile depth was determined, it is possible for the user to get an overall impression of the quality of tread 16 of all four wheels 4 of a vehicle 6, without dismounting wheel 4.

The device is obviously able to be extended without any problem to vehicles, particularly commercial vehicles which have more than two axles, and consequently more than four wheels 4, so that one is able to inspect all wheels 4 of a multi-axle vehicle 6 simultaneously.

Above profile depth diagram 18 there is in each case shown the minimum of the profile depth measured over the width of tread 16. Thus one may test in an especially simple and reliable manner whether a minimally admissible profile depth is being undershot. In the case of the undershooting of a minimum profile depth, an optical or acoustical warning signal may be output in addition, for instance by showing the value for minimum profile depth 20 in a different color. The minimum admissible profile depth may also be shown in addition to the measured profile depth in profile depth diagram 18, so that, over the entire curve of the width of tread 16, the distance of the measured profile depth from the minimally admissible profile depth is recognizable.

Figure 3:
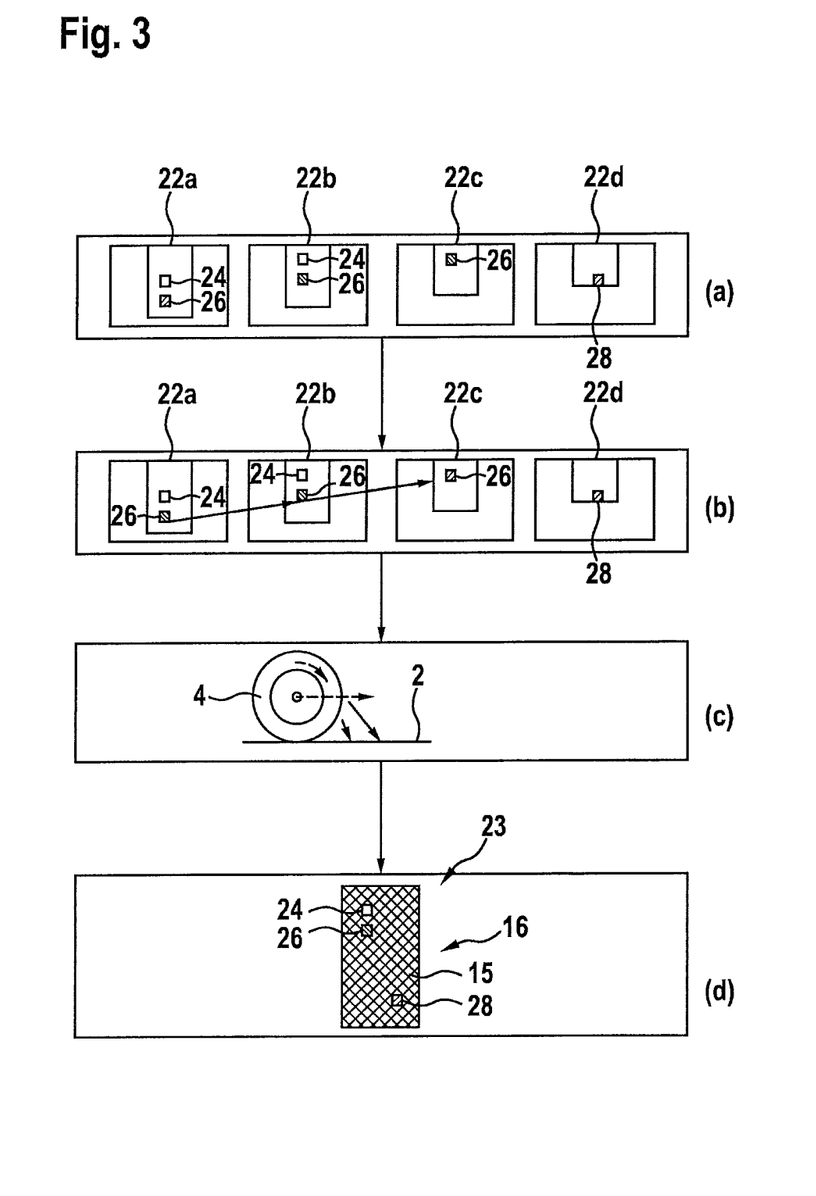
FIG. 3 shows a method of image preparation for the two-dimensional representation of a larger area of the tread of the tire from a plurality of images of an image sequence.

One method for image preparation for the two-dimensional representation of a larger area of tread 16 of tire 4 from a plurality of images of an image sequence, particularly as a developed view of tread 16, is shown in FIG. 3.

For this, during the travel of tire 4 over plane 2, a plurality of images is taken of tire 4 which, because of the rolling away motion of tire 4, in each case show a different area 22a to 22d of tread 16.

These images of individual areas 22a to 22d of tread 16 are then calculated with one another to form a synthetic total overview image 23 of tread 16 of tire 4. For this purpose, methods of image processing are used which are known under the heading "image stitching".

On one possible variant for combining the individual images of the image sequence, prominent features 24, 26, 28 of tread 16 of tire 4 are used which are respectively present in a plurality of the images. The motion of these features 24, 26, 28 in the curve of the image sequence is identified ("feature tracking") so that the various images are able to be combined with one another based on the identified features 26, so as to obtain an overview image 23 of a larger area of overall tread 16 of tire 4. In contrast to the images shown in FIG. 2 of first areas 15 of tread 16, FIG. 3d shows an overview image 23 of a developed view tread 16, which has been calculated with the aid of geometric and radiometric transformation parameters, which were determined from the motion of characteristic features 24, 26, 28 in images 22a to 22d. Overview image 23 shows a larger area of tread 16 than the images of first area 15.

Figure 4:
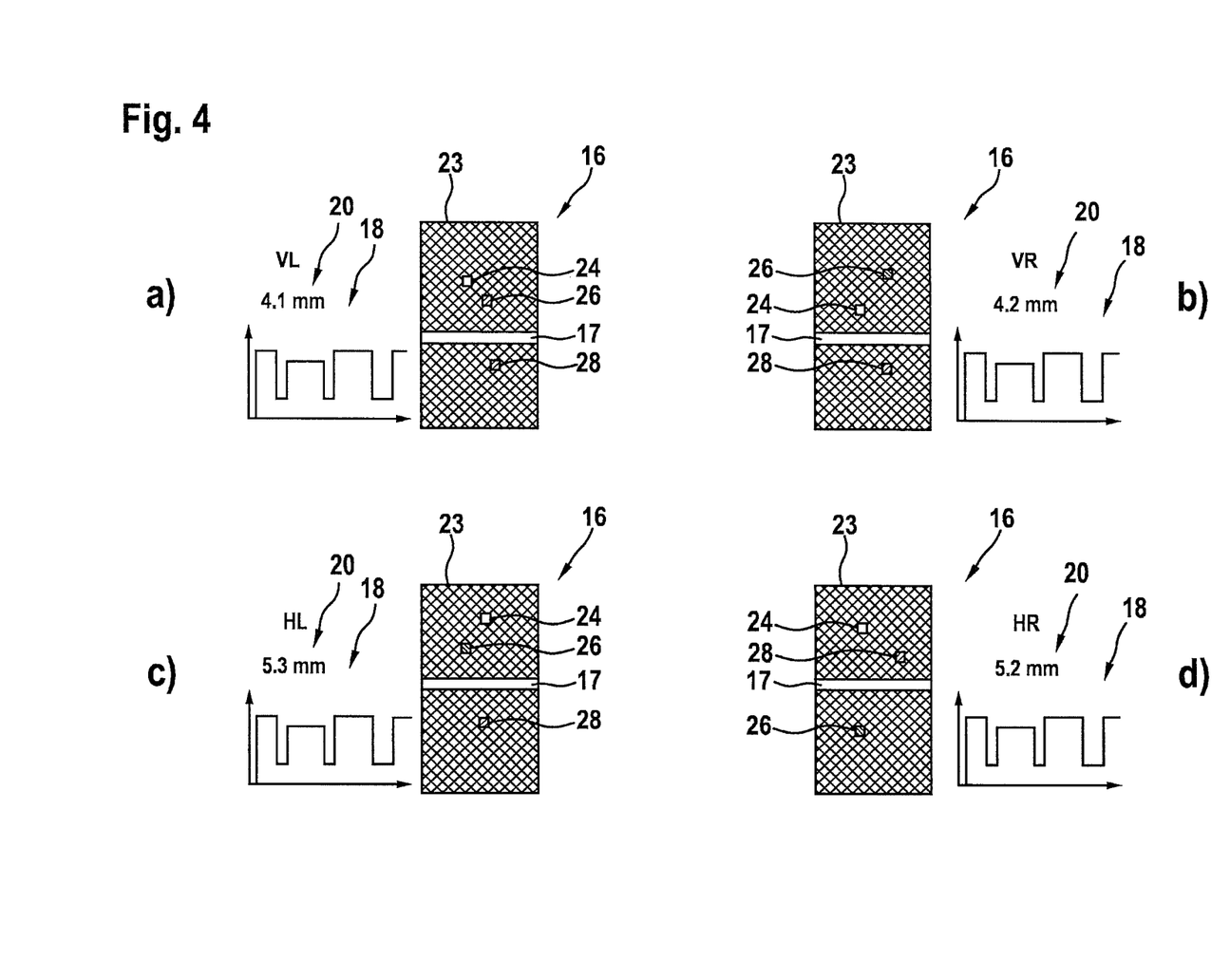
FIG. 4 shows a representation corresponding to FIG. 2 of an area of the treads and profile depths via a second area marked on the respective tread.

FIG. 4 shows representations corresponding to FIG. 2 of an area of tread 16 and the profile depth over a second area 17 marked on respective tread 16, wherein in place of the directly taken images of first area 15 of tread 16 of individual tires 4, as are shown in FIGS. 2a to 2d, in each case overview images 23 of treads 16 are shown. The overview images were composed with the aid of characteristic features 24, 26, 28, as have been described in connection with FIG. 3, from the individual images of an image sequence, which were taken by a camera 8 associated with the respective tire 4, and each show a developed view overall image of a larger area of respective tread 16.

Figure 5:
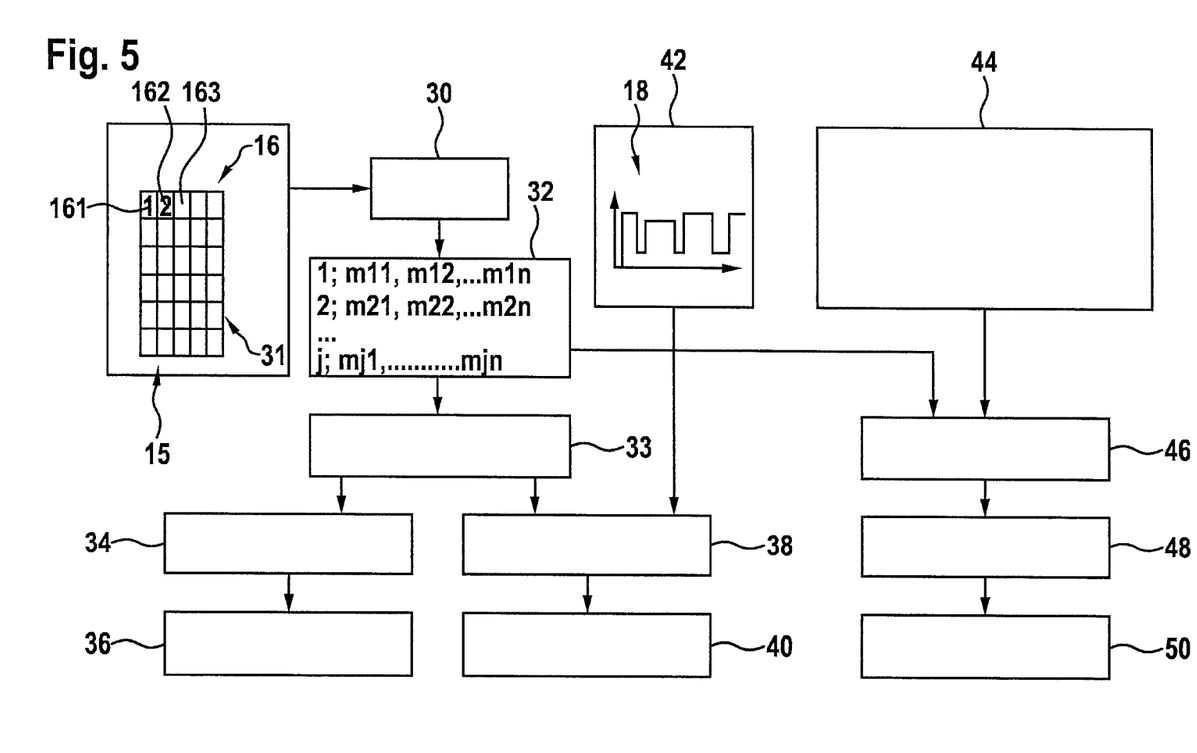
FIG. 5 shows schematically the sequence of a method for the automated valuation of a tire tread.

FIG. 5 shows schematically the sequence of a method for the automated valuation of tire tread 16. For the automated valuation, a 2D image 31 of an area 15 of tire tread 16 is used. 2D image 31 may be an image having intensity data (a gray-scale value image) or an image having color data. 2D image 31 may be composed, as was described before in connection with FIG. 3, of a sequence of a plurality of images. In addition, a possibly existing measurement of the profile depth may be included in the evaluation process.

In FIG. 5, 2D image 31 of tire tread 16 is subdivided uniformly into a number of image sections 161, 162, 163, .... For the evaluation of 2D image 31 of tire tread 16, in a first step "feature calculation" 30, texture features m11, m12, ... are first of all systematically calculated for each of image sections 161, 162, 163, ....

In feature calculation 30, standard methods from image analysis may be used. Thus, for each image section 161, 162, 163,
a Fourier transform, for example, may be calculated from the intensity information. The Fourier coefficients obtained in this manner then represent texture features m11, m12, ....

Alternative texture features m11, m12, ... may, for instance, be the result of a filtering using gradient filters or complex filters, such as Gabor wavelets, Haar wavelets, etc.

In one specific embodiment of the intelligent evaluation, for the valuation of tire tread 16 in step 33, texture features m11, m12, ... between various image sections 161, 162, 163, ... are compared to one another.

This makes possible a simple statistical evaluation of texture features m11, m12, ... over tire tread 16. For each of texture features m11, m12, ... from all image sections 161, 162, 163, ... one is able to calculate an average value and a standard deviation. For each image section 161, 162, 163, ... one may then determine whether a significant deviation from the average value and the standard deviation has occurred (step 34). Thus, defects in tread 16 of tire 4 may be detected and displayed, if necessary (step 36).

Using known methods, one may, for example, carry out a regression on features m11, m12, ..., in order to detect non-uniform wear. Conspicuous areas may then be visualized, for example, in image 22a, 22b, 22c, 22d, 23 of tread 16 of tire 4 (see FIG. 3).

In addition, methods known from machine learning, such as "nearest neighbor classification" or cluster methods may be used, to compare feature vectors of the individual image sections 161, 162, 163, ... with one another, so as to detect a possibly present, non-uniform wear condition.

In a further step 38 of the automatic analysis, 3D profile depth measurement 18, present for a limited section 17 of tire tread 16 is included in the valuation, in order to identify conspicuous areas of tread 16 of tire 4, and to show it in a subsequent step 40.

For a limited number of image sections, there exist 3D profile depth measurements 18. These 3D profile depth measurements 18 are assigned to texture features m11, m12, .... In that way a statement can also be made on the condition of the 3D tire profile.

On the assumption that the profile texture in the running direction of tire 4 remains the same, in the case of a profile depth that remains the same, one may assume that texture features m11, m12, ... do not change significantly in the running direction.

In addition, an extrapolation of the 3D information may be used to estimate the 3D depth for areas not explicitly measured of tire tread 16. If changes are determined in texture features m11, m12, ..., non-uniform wear of tread 16 of tire 4 is able to be determined and classified.

A further step of texture analysis includes collecting texture features m11, m12, ... for the image sections from a greater quantity of different tires 4 having different profile patterns, degrees of abrasion and also damage images in a data bank 44.

A comparison of the currently measured texture features m11, m12, ... with the texture features collected in data bank 44 (step 46) makes it possible to value tread 16 of tire 4 automatically. In this instance, methods from machine learning may again be used. A classifier may in particular be trained, which will assign the currently measured texture features m11, m12, ... to an existing class in data bank 44 (step 48).

By the comparison of texture features m11, m12, ... with the classes of data bank 44 in a step 50, a classification of the tire type is possible in addition. Furthermore, certain images of damage and degrees of abrasion may be classified and detected.

Alternatively, it is also possible to compare to one another texture features m11, m12, ... of the different tires 4 of a vehicle. In this way, it may be detected whether, for example, different tires 4 have been mounted on the vehicle, or whether there exist different states of wear.

Using the method described, in the manner described before, among other things, the following functions may be implemented:
  detecting non-uniform abrasion, for instance, by utilizing image features such as local contrast, edge thickness, edge sharpness, texture: great abrasion means less local contrast, less sharp edges. Subdivision into patches, comparison of the patches among one another. Training of a classifier. Classification of a tire area into various degrees of abrasion.
  detection of faulty axle alignment and/or faulty shock absorbers
  classification of tire types (e.g. by calculating texture features, segmenting tire grooves via gray-scale values, analysis of the width, orientation and frequency of the grooves, training a classifier)
  detection of damage as well as underpressure and overpressure, respectively FIGS. 6(a), 6(b) and 6(c) show schematically the combination previously described in connection with step 38, of 2D image 31, including the intensity data, with the result of 3D profile depth measurement 18.

Figure 6:
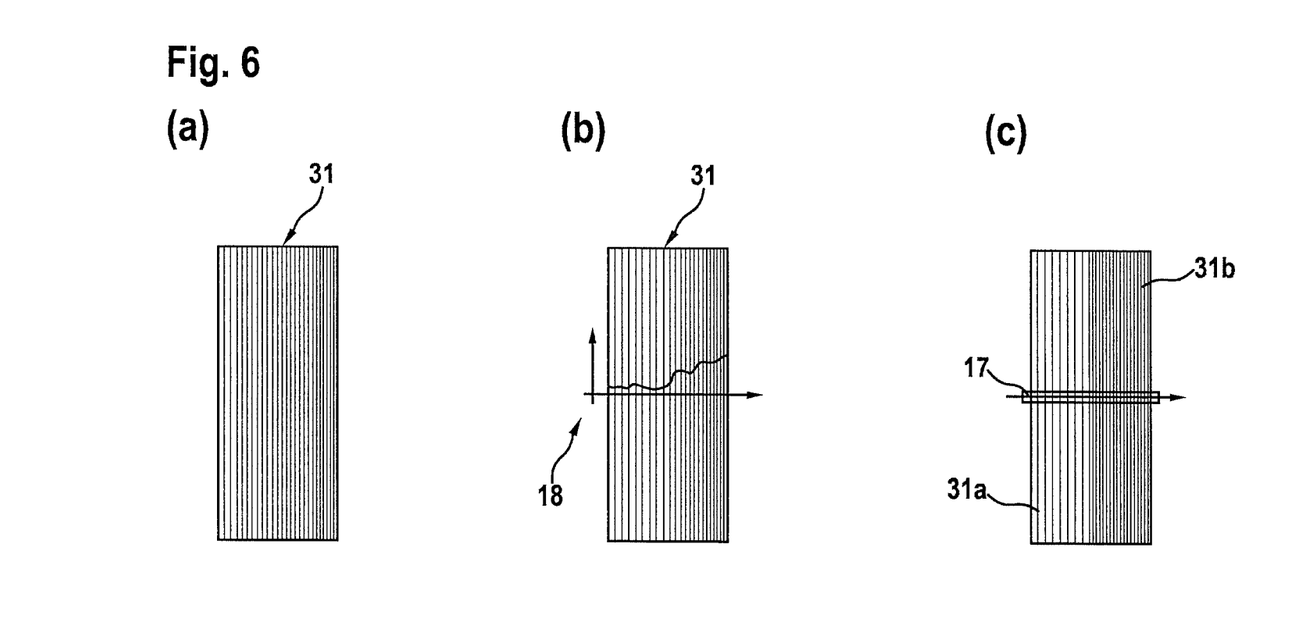
FIG. 6 shows schematically the combination of a 2D image including intensity data with the result of a 3D profile depth measurement.

FIG. 6(a) shows schematically an increase in the contrast or the texture of 2D image 31 of tire tread 16 from left to right.

In FIG. 6(b), result 18 of a 3D profile depth measurement is superposed on 2D image 31 of tread 16 of a tire 4.

From the combination of 2D image 31 with result 18 of the 3D profile depth measurement, it may be concluded that area 31a, shown at the left in FIG. 6(c), probably has an insufficient profile depth over its entire length (in FIGS. 6(a)-(c) from top to bottom), whereas area 31b shown at the right in each case in FIGS. 6(a)-(c) with great probability has a sufficient profile depth over its entire length, although the profile depth has been measured over only a small area 17 of tread 16.

What is claimed is:
1. A method for inspecting tires; the method comprising:
  taking at least one 2D image of at least one first area of a tread of a tire that is to be inspected;
  determining a profile depth of at least one second area of the tread of the tire by 3D profile depth measurement; the second area being included in the first area;
  dividing the at least one 2D image into a plurality of image sections;
  calculating texture features for each of the image sections;
  assigning the at least one 3D profile depth measurement to the texture features; and simultaneously displaying the at least one 2D image of the at least one first area; the position of the second area in the first area; and the determined profile depth.

2. The method of claim 1; wherein the 2D image is a 2D gray-scale value image or a 2D color image.

3. The method of claim 1; further comprising:
illuminating at least the second area of the tread of the tire.

4. The method of claim 1; further comprising: determining a minimum profile depth of the second area of the tread; and simultaneously displaying the minimum profile depth of the second area of the tread along with the at least one image of the at least one first area; the position of the second area in the first area; and the profile depth.

5. The method of claim 1, wherein the taking the at least one image includes taking an image sequence having a plurality of images of different areas of the tread of the tire, the method further comprising: composing an overview image of a greater area of the tread of the tire from the images of the image sequence; and displaying the overview image.

6. The method of claim 5, further comprising: identifying characteristic features of the tread; and composing the images of the image sequence to form the overview image with the aid of the characteristic features.

7. The method of claim 5, further comprising:
analyzing the images of the image sequence automatically, so as to arrive at statements on the condition of the tread.

8. The method of claim 7, further comprising:
taking into account the previously determined profile depth in the analysis and/or identifying texture features of the tread, and
comparing them with previously stored texture features and/or comparing the texture features of the tires of a vehicle to one another.

9. A device for inspecting tires, the device comprising:
at least one camera to take a 2D image of at least one first area of a tread of a tire that is to be inspected,
an optical projection device to illuminate at least one second area of the tread of the tire that is to be inspected, the second area being included in the first area, an evaluation device configured for:
determining the profile depth in the second area of the tread of the tire from the 2D image taken by the camera;
dividing the at least one 2D image into a plurality of image sections;
calculating texture features for each of the image sections; and
assigning the at least one 3D profile depth measurement to the texture features; and
a display device to simultaneously display the profile depth determined by the evaluation device, the 2D image of the at least one first area of the tread, and the position of the second area within the first area of the tire.

10. The device of claim 9, wherein the evaluation device is configured to analyze the taken image, so as to arrive at a statement on a condition of the tread.

11. The device of claim 9, wherein the evaluation device determines a minimum profile depth of the second area of the tread, and the display device simultaneously displays the minimum profile depth along with the image of the at least one first area of the tread, the position of the second area within the first area, and the profile depth.

12. The device of claim 9, wherein the at least one camera takes an image sequence having a plurality of images of different areas of the tread of the tire, the plurality of images including the at least one image,
the evaluation device composes an overview image of a greater area of the tread of the tire from the images of the image sequence, and
the display device displays the overview image.

13. The method of claim 1, wherein the displayed profile depth includes a two dimensional representation of the profile depth over a width of the tread in the second area.

14. The method of claim 1, further comprising simultaneously displaying the at least one image, the position of the second area, and the profile depth for each of a plurality of tires.

15. The method of claim 4, further comprising, upon determining that the minimum profile depth is below a predetermined value, providing an optical or acoustical warning.

16. The method of claim 4, wherein the second area is a section of the tread over a full width of the tire.

17. The non-transitory machine-readable storage medium including program instructions, which when executed by a processor perform a method for inspecting tires, the method comprising:
taking at least one 2D image of at least one first area of a tread of a tire that is to be inspected,
determining a profile depth of at least one second area of the tread of the tire by 3D profile depth measurement, the at least one second area being included in the first area, dividing the at least one 2D image into a plurality of image sections; calculating texture features for each of the image sections;
assigning the at least one 3D profile depth measurement to the texture features; and simultaneously displaying the at least one 2D image of the at least one first area, the position of the second area in the first area, and the profile depth.

18. The non-transitory machine-readable storage medium of claim 17, the method further comprising:
determining a minimum profile depth of the second area of the tread, and simultaneously displaying the minimum profile depth with the at least one image, the position of the second area, and the profile depth.

19. The non-transitory machine-readable storage medium of claim 17, the method further comprising:
taking an image sequence having a plurality of images of different areas of the tread of the tire, the plurality of images including the at least one image,
composing an overview image of a greater area of the tread of the tire from the images of the image sequence, and displaying the overview image.

20. The non-transitory machine-readable storage medium of claim 17, wherein the displayed profile depth includes a two dimensional representation of the profile depth over a width of the tread in the second area.

21. The method of claim 1, wherein the determined profile depth overlays the at least one 2D image.

22. The device of claim 9, wherein the determined profile depth overlays the at least one 2D image.

23. The non-transitory machine-readable storage medium of claim 17, wherein the determined profile depth overlays the at least one 2D image.

* * * * *